US 012389214 B2

(12) United States Patent
Raghavachari et al.

(10) Patent No.: US 12,389,214 B2
(45) Date of Patent: Aug. 12, 2025

(54) NETWORK DRIVEN PRIVATE AND MACRO NETWORK INTERWORKING

(71) Applicant: Verizon Patent and Licensing Inc., Basking Ridge, NJ (US)

(72) Inventors: Balaji L. Raghavachari, Bridgewater, NJ (US); Lily Zhu, Parsippany, NJ (US); Taussif Khan, Martinsville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 481 days.

(21) Appl. No.: 17/813,465

(22) Filed: Jul. 19, 2022

(65) Prior Publication Data
US 2024/0031791 A1    Jan. 25, 2024

(51) Int. Cl.
| | |
|---|---|
| H04W 4/00 | (2018.01) |
| H04W 8/08 | (2009.01) |
| H04W 8/18 | (2009.01) |
| H04W 8/24 | (2009.01) |
| H04W 28/02 | (2009.01) |
| H04W 48/10 | (2009.01) |
| H04W 84/04 | (2009.01) |

(52) U.S. Cl.
CPC ............... *H04W 8/08* (2013.01); *H04W 8/24* (2013.01); *H04W 48/10* (2013.01); *H04W 84/042* (2013.01)

(58) Field of Classification Search
CPC ......... H04W 8/08; H04W 8/082; H04W 8/24; H04W 48/10; H04W 84/042; H04W 92/20; H04W 36/0061; H04W 84/105; H04W 88/10; H04W 88/12; H04W 48/20; H04W 88/08; H04W 8/005
See application file for complete search history.

(56) References Cited

U.S. PATENT DOCUMENTS

| | | | | |
|---|---|---|---|---|
| 2020/0053821 | A1* | 2/2020 | Shih ....................... | H04W 48/20 |
| 2022/0408352 | A1* | 12/2022 | Fujishiro ................ | H04W 92/20 |
| 2023/0156530 | A1* | 5/2023 | Jeong .............. | H04W 36/00226 370/331 |
| 2023/0284119 | A1* | 9/2023 | Kim ....................... | H04W 60/00 370/329 |

* cited by examiner

*Primary Examiner* — Sai Aung (57) ABSTRACT

Systems and methods described herein provide a network-based solution to efficiently transition private network subscribers from a macro network to a private network. A network device in the macro network stores a neighbor list identifying a private network that has overlapping coverage with a cell for the macro network. The network device detects that a user equipment (UE) device connected to the network device has a subscription to the private network and, in response to the detecting, sends, a release message to the UE device. The release message includes a redirection to the private network.

20 Claims, 10 Drawing Sheets

- SIB25

SystemInformationBlockType25-r18 ::= SEQUENCE { networkListNR-r18           NetworkListNR-r18 OPTIONAL, -- Need ⎫
    t-ReselectionNR-r18         T-Reselection,                      ⎬ 710
    t-ReselectionNR-SF-r18      SpeedStateScaleFactors OPTIONAL, -- Need OR ⎭
    ...
    } networkListNR-r18 ::= SEQUENCE (SIZE (1..maxNetwork)) OF NetworkNR-r18
    NetworkNR-r18 ::= SEQUENCE {
        networkListNR-r18       PLMN-IdentityList,
    ...... (rest is the same as carrierFreqList in other neighbor list)

FIG. 7A

- RRC Connection Release
  - releaseCause ::= ENUMERATED [other]
  - redirectedNetworkInfo ::= networkListNR-r18 OPTIONAL, -- Need } 720

NETWORK DRIVEN PRIVATE AND MACRO NETWORK INTERWORKING

BACKGROUND INFORMATION

Public Land Mobile Networks (PLMNs) are traditionally designed to support mobile devices over an extensive geographic area (e.g., national or regional coverage). Private mobile networks, in contrast, may use similar wireless technologies but may be constrained to a smaller geographic area. Private mobile networks may be used for a variety of reasons, such as to assure better local coverage, low latency, privacy, security, or flexibility to launch specific services. For private mobile network subscribers, there may be a need to fall back to a PLMN when private network coverage is not available and automatically return to the private network coverage when it becomes available.

DETAILED DESCRIPTION OF EXAMPLE EMBODIMENTS

The following detailed description refers to the accompanying drawings. The same reference numbers in different drawings may identify the same or similar elements.

A Public Land Mobile Network (PLMN) operator may offer services to private network subscribers to allow the private network subscribers to utilize the PLMN and its network services based on a policy that is established for a respective private network (e.g., as differentiated by a PLMN identifier (ID) or another private network identifier). There are an increasing number of use cases that require tight interworking between public networks (e.g., PLMNs) and private networks on the same device.

For example, user equipment (UE) devices can be configured to be able to use both a public network (also referred to as a macro network) and a private network. The private network typically is assigned higher access priority than that assigned to the public network. That is, whenever the private network is available, the UE device should access the private network using credentials for the private network, even if the macro network is also available at the same location. Whenever the private network is not available, the UE device can receive services from the macro network using the macro network credentials.

For operators providing both macro network and private network services, the private network and macro network can be independent of each other (e.g., unique PLMN IDs, unique credentials, unique home subscriber server (HSS)/unified data management (UDM), unique backhaul network, etc.). A UE device can be provisioned with different network credentials (e.g., different IMSIs) to access the private network and the macro network, respectively. In a mobility context for private network subscribers, it is desirable to have an automatic, seamless switch between the private network and the public network with minimal delays.

One possible approach to providing a solution to service these use cases may be using a device-based approach, where a UE device performs regular scans for a highest priority network. Periodic scanning for the higher priority network (e.g., the private network in this case) can negatively impact battery life for the UE device, especially when the private network is not available in most locations. Periodic scanning also causes delays, since the trigger of higher priority network selection is based on a configurable timer, which could use scanning intervals of up to six minutes or more.

Another approach to providing a solution to service these use cases may be using a network-based approach, where the mobile network redirects the UE device from the macro network to the private network when the private network is available (whether the UE device is in either an idle mode or RRC connected mode). This network approach may entail providing network knowledge or a neighbor list in the macro network. The neighbor list may identify private networks in the coverage area of a macro network cell. In contrast with a device-based approach, the network-based approach may provide faster transitions to private networks and may be more battery friendly for the UE device.

Systems and methods described herein provide a network-based solution to efficiently transition private network subscribers from a macro network to a private network. A network device (e.g., an access node or base station) in the macro network stores a neighbor list identifying a private network that has overlapping coverage with a cell for the macro network. The network device detects that a UE device connected to the network device has a subscription to the private network and in response to the detecting, sends a release message to the UE device. The release message redirects the UE device to the private network.

Figure 1:
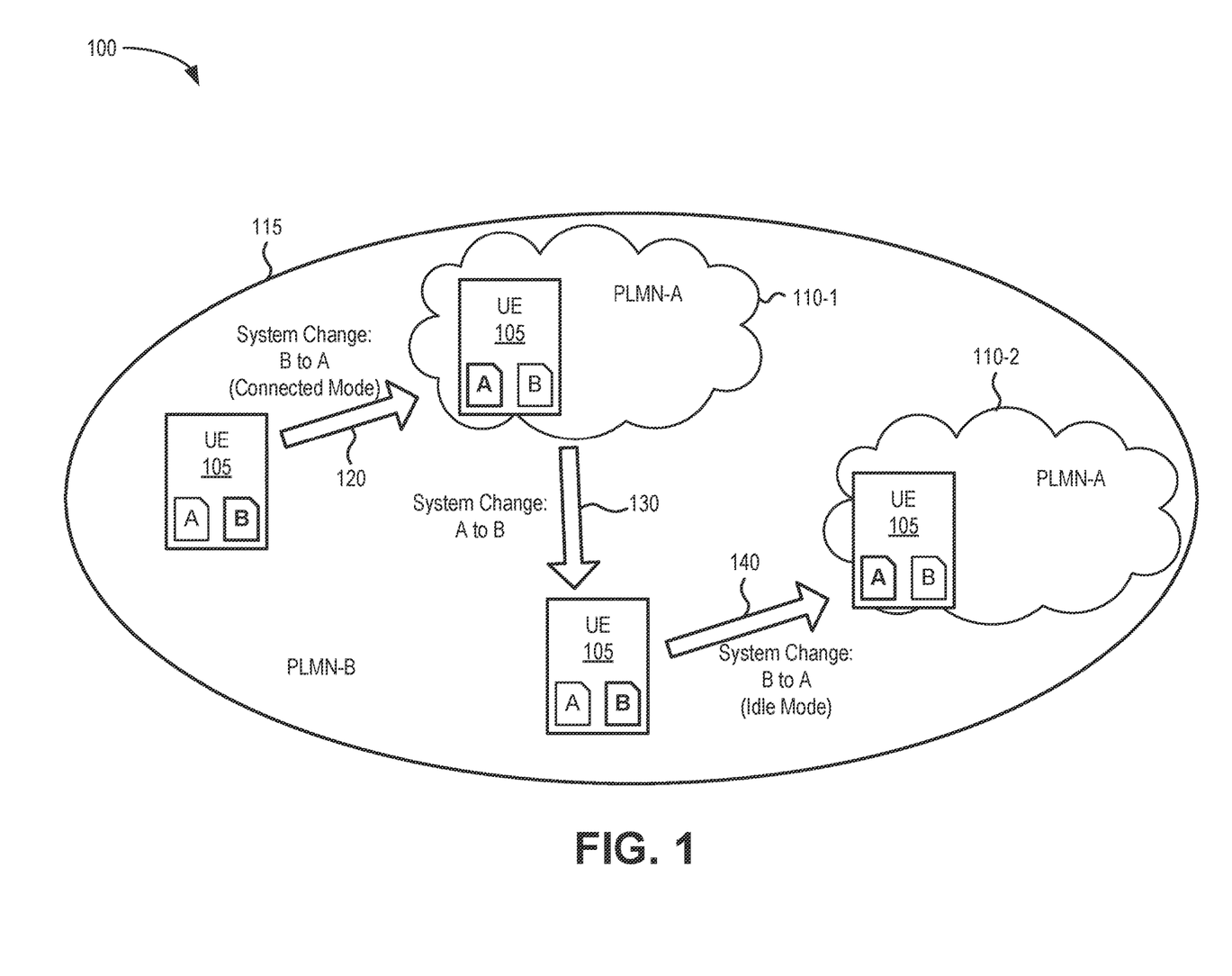
FIG. 1 is a diagram illustrating concepts described herein.

FIG. 1 illustrates concepts described herein. As shown in FIG. 1, an environment 100 may include a UE device 105 (also referred to as UE 105), a private network coverage areas 110-1 and 110-2, and a public network coverage area 115.

Private network coverage areas 110-1 and 110-2 (referred to collectively as "private network coverage areas 110") may be included within the larger public network coverage area 115. Private network coverage areas 110-1 and 110-2 may be associated with a private network identifier (e.g., a PLMN ID, such as "PLMN-A"), and public network coverage area 115 may be associated with a public network identifier (e.g., "PLMN-B").

Figure 2:
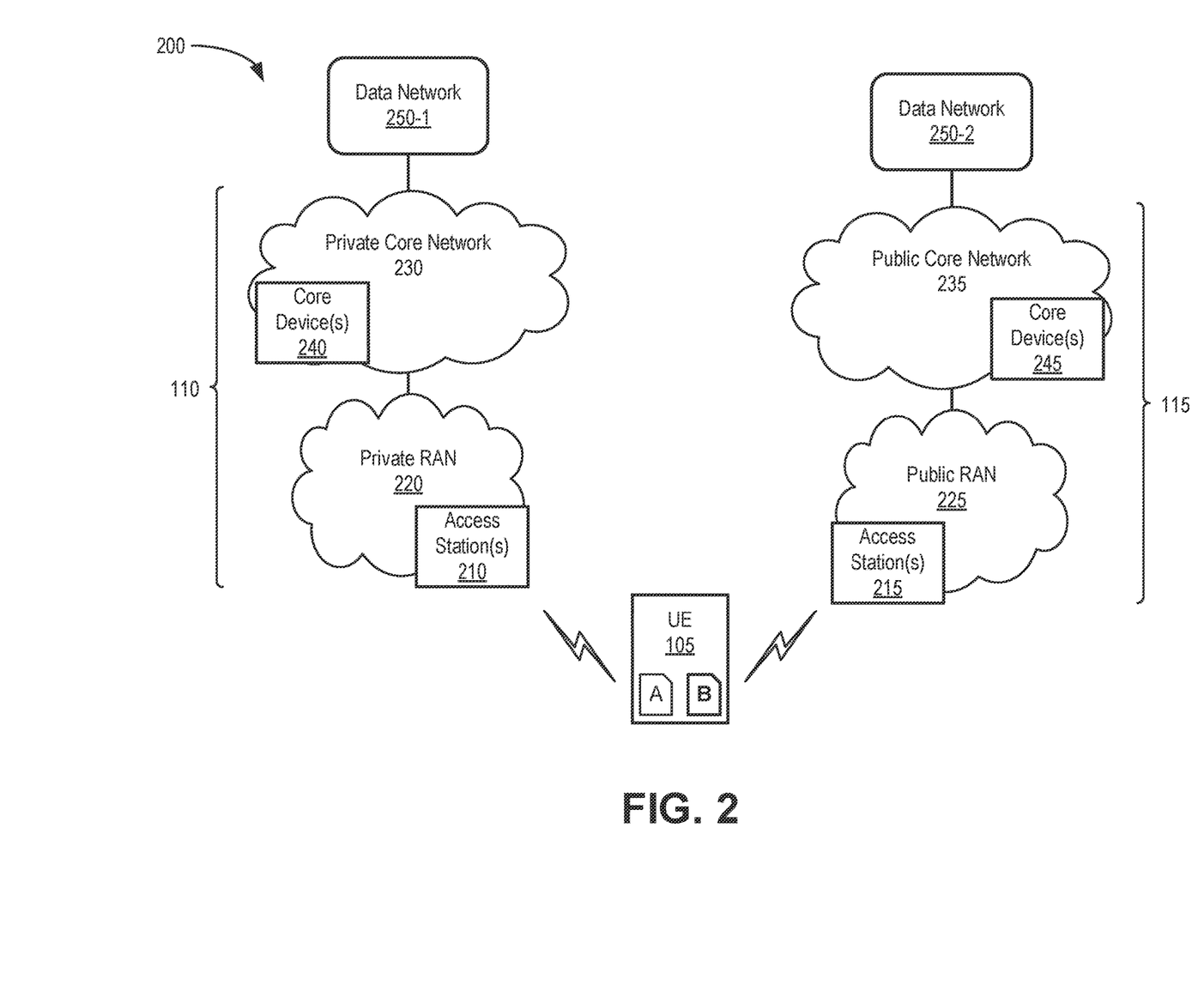
FIG. 2 illustrates an example network in which the systems and methods described herein may be implemented.

UE device 105 (e.g., a smartphone or another mobile cellular device) may be configured with a subscription to both the private network, indicated by PLMN-A, and the public network, indicated by PLMN-B. Assume for UE device 105 that the private network (PLMN-A) is assigned a higher priority than a priority assigned to the public network (PLMN-B). Whenever UE 105 is within coverage areas 110, UE 105 should access the private network. Whenever UE 105 is outside of coverage areas 110, the UE 105 can receive services from the public network. To receive services within the different coverage areas 110 and 115, UE 105 may transition between using credentials for the private network (e.g., a SIM "A") and credentials for the public network (e.g., SIM "B").

As shown in FIG. 1, UE device 105, in a mobility context, may move within public network coverage area 115 into and out of private network coverage areas 110. For example, at transition 120, UE device 105 may transition from public network coverage area 115 to private network coverage area 110-1 while in a connected state (e.g., a Radio Resource Control (RRC) connected mode). UE device 105 would likely not detect any signal degradation for PLMN-B when UE enters private network coverage area 110-1, since UE device 105 remains in public network coverage area 115. Thus, according to implementations described herein, devices in PLMN-B may provide a network-based trigger, in the form of a connection release message from PLMN-B, to quickly initiate a system change in UE device 105 from PLMN-B to PLMN-A.

At transition 130, UE device 105 may transition out of private network coverage area 110-1 and back into public network coverage area 115. UE device 105 would detect signal degradation for PLMN-A when UE exits private network coverage area 110-1 and automatically perform a system change from PLMN-A to PLMN-B.

At transition 140, assume UE device 105 has entered into an idle mode, due to inactivity. UE device 105 may transition from public network coverage area 115 to private network coverage area 110-2. Again, UE device 105 would likely not detect any signal degradation for PLMN-B when UE enters private network coverage area 110-2. Thus, network devices for PLMN-B may provide a trigger, in the form of a broadcast signal, to initiate a system change in UE device 105 from SIM "B" to SIM "A," so that UE device 105 will initiate a connection to PLMN-A upon exiting the idle mode.

FIG. 2 is simplified diagram of a network environment 200 in which systems and methods described herein may be implemented. As shown in FIG. 2, environment 200 may include UE device 105, private network 110, and a macro network 115. Private network 110 may include a private RAN 220 and a private core network 230. Macro network 115 may include a public RAN 225 and a public core network 235. Network environment 200 may also include a one or more data networks 250.

UE device 105 may include any device with long-range (e.g., cellular or mobile wireless network) wireless communication functionality. For example, UE device 150 may include a handheld wireless communication device (e.g., a mobile phone, a smart phone, a tablet device, etc.); a wearable computer device (e.g., a wristwatch computer device, etc.); a portable computer; a customer premises equipment (CPE) device, such as a set-top box or a digital media player, a WiFi access point, a smart television, etc.; a mobile device; a portable gaming system; global positioning system (GPS) device; a home appliance device; a home monitoring device; a fixed wireless access (FWA) device; and/or any other type of computer device with wireless communication capabilities. Other examples of UE device 105 may include a machine-type communication (MTC) device, an Unmanned Aerial Vehicle (UAV), and an autonomous terrestrial vehicle.

UE 105 may be registered with private network 110 and include a Subscriber Identity Module (SIM), illustrated as SIM "A" in FIG. 2. A SIM may include, for example, an embedded SIM (eSIM), a Universal Integrated Circuit Card (UICC), or embedded UICC (eUICC). The SIM may store a user (or a subscriber) credentials associated with accessing private network 110. Furthermore, to enable UE 105 to receive services from other networks (e.g., macro network 115) when outside the coverage area of private network 110, UE 105 may also include a separate SIM or other credentials for accessing macro network 115, illustrated as SIM "B" in FIG. 2.

Private network 110 may include a private wireless network that includes a private radio access network (RAN) 220, a private core network 230. For example, private network 110 may be associated with an enterprise or corporate entity. RAN 220 may allow UE 105 to access core network 230. To do so, RAN 220 may establish and maintain, with participation from UE 105, an over-the-air channel with UE 105 and maintain backhaul channels with core network 230. RAN 220 may convey information through these channels, from UE 105 to core network 230 and vice versa.

RAN 220 may include an LTE radio network, a Next Generation (NG) radio access network (e.g., Fifth Generation (5G) radio access network) and/or another advanced radio network. These radio networks may operate in many different frequency ranges, including millimeter wave (mmWave) frequencies, sub 6 GHz frequencies, and/or other frequencies. RAN 220 may include multiple wireless stations (e.g., eNodeBs, gNodeBs, or other base stations), Central Units (CUs), Distributed Units (DUs), Radio Units (RUs), and/or Integrated Access and Backhaul (IAB) nodes, referred to collectively herein as access stations 210. Access station 210 may establish and maintain over-the-air channels with UEs 105 and backhaul channels with core network 230.

Core network 230 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, an intranet, a PLMN, or a combination of networks. Core network 230 may allow the delivery of Internet Protocol (IP) services to UE 105 and may interface with other networks, such as data network 250.

Core network 230 may include various core devices 240. Depending on the implementation, core devices 240 may include 5G core network components (Unified Data Management (UDM) function, an Access and Mobility Management Function (AMF), an Authentication Server Function (AUSF), and a Unified Data Repository (UDR), etc.) and/or 4G core network components (e.g., a Serving Gateway (SGW), a Packet data network Gateway (PGW), a Mobility Management Entity (MME), a Home Subscriber Server (HSS), an Authentication Authorization and Accounting (AAA) server, a Policy and Charging Rules Function (PCRF), etc.). Core devices 240 may also include other 4G and/or 5G core network components, including combined 4G/5G network components.

Data network 250-1 may include one or more networks that are external to core network 230. In some implementations, data network 250-1 may include packet data networks, such as an Internet Protocol (IP) network. In another implementation, data network 250-1 may be part of core network 230. Data network 250-1 may provide particular network services, such as, for example, Voice-over-IP (VoIP) services, messaging services, video services, etc.

Macro network 115 (also referred to herein as "public network 115") may include a PLMN associated with a mobile network operator (MNO). Macro network 115 may include a public RAN 225 and a public core network 235. Public RAN 225 and a public core network 235 may include components similar to those described above in connection with private RAN 220 and a private core network 230. For example, public RAN 225 may include one or more access stations 215 that support an LTE radio network, a NG RAN, and/or another advanced radio network. Public core network 235 may include core devices 245. Similar to core devices 240 described above, core devices 245 may include core network components, including 4G or 5G core network components, future generation components and/or combined network components. Macro network 115 may include additional components that are not shown in FIG. 2 for simplicity.

Generally, macro network 115 may have a larger coverage area (e.g., regional, national, international) than private network 110. For example, access stations 215 of macro network 115 may provide numerous overlapping cells (or coverage areas) and serve as a fallback network for private network 110. Thus, while private RAN 220 and public RAN 225 are shown separately in FIG. 2, in many geographic areas, coverage of public RAN 225 will overlap coverage of private RAN 220.

Figure 3:
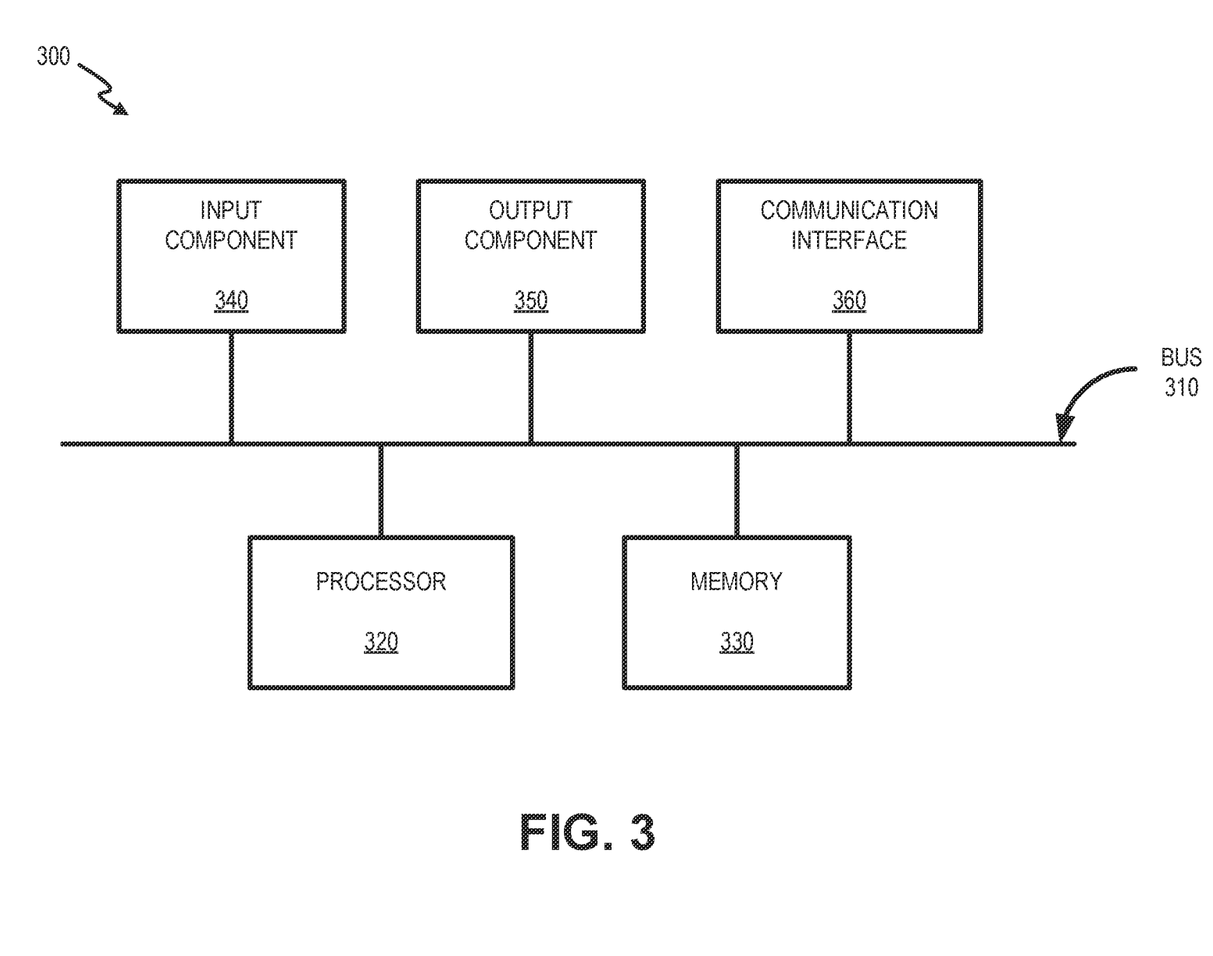
FIG. 3 depicts example components of a device described herein.

FIG. 3 is a diagram illustrating exemplary components of a device 300. Device 300 may correspond to or include, for example, UE device 105, access stations 210/215, core devices 240/245, or another component of network environments 100/200. Alternatively or additionally, UE device 105, access station 210/215, core device 240/245, or the others components of network environment 100 may include one or more devices 300 and/or one or more components of device 300.

Device 300 may include a bus 310, a processor 320, a memory 330, an input component 340, an output component 350, and a communication interface 360. Although FIG. 3 shows exemplary components of device 300, in other implementations, device 300 may contain fewer components, additional components, different components, or differently arranged components than those depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320. Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of RF signals. For example, communication interface 360 may include one or more antennas to transmit and/or receive RF signals over the air. Communication interface 360 may, for example, receive RF signals and transmit them over the air to UE device 105/RAN 220, and receive RF signals over the air from RAN 220/UE device 105. In one implementation, for example, communication interface 360 may communicate with a network and/or devices connected to a network. Alternatively or additionally, communication interface 360 may be a logical component that includes input and output ports, input and output systems, and/or other input and output components that facilitate the transmission of data to other devices.

Device 300 may perform certain operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
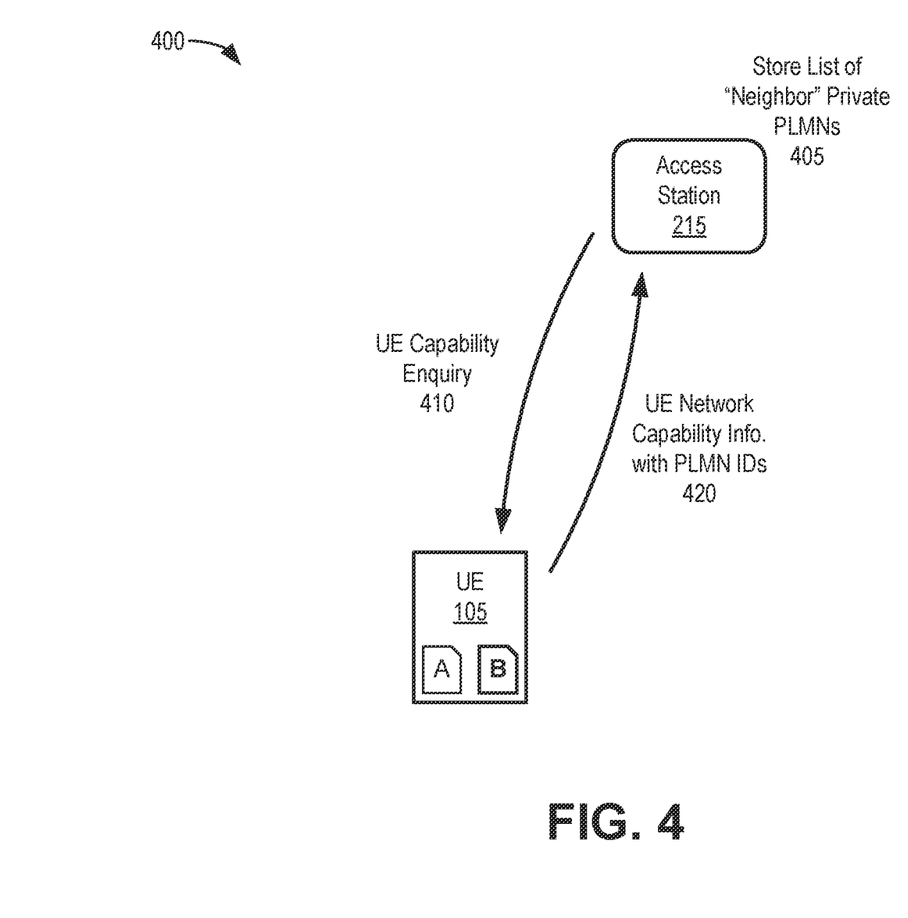
FIG. 4 is a diagram illustrating communications to identify private network capabilities of a UE device, according to an implementation.

FIG. 4 is a diagram illustrating communications to identify private network capabilities of a UE device. More particularly, FIG. 4 illustrates communications in a portion 400 of network environment 200 that includes access station 215 of public RAN 225 and UE device 105.

According to an embodiment, access station 215 may store a "knowledge/neighbor" list 405 of private networks that are co-located in the coverage area (or cell) of access station 215. Neighbor list 405 may be configured as part of a provisioning process when a private network is set up, for example, by a mobile network operator. The neighbor list 405 may identify PLMN IDs, priority levels, RAT-types, and/or other information for each private network that is available within the coverage area of access station 215. As described further herein, the neighbor list 405 may be used to match connected UE devices 105 with higher priority private networks in the coverage area of access station 215. Access station 215 may also include logic that categorizes or determines facets associated with the attachment to UE device 105, such as the type of UE device 105 (e.g., an NB-IoT device versus a user device, etc.), the mobility characteristics of UE device 105 (e.g., stationary device, high mobility, low mobility, etc.), the access mode used by UE device 105 to attach to access station 215 (e.g., LTE, eMTC mode A, eMTC mode B, NB-IoT, etc.), and/or end device capability information pertaining to UE device 105.

According to an implementation, access station 215 may obtain end device capability information from UE device 105. For example, during an attachment procedure, access station 215 may transmit a control/signaling message, such as a UE capability enquiry message 410, to UE device 105. Typically, UE capability enquiry message 410 is a request for a UE device to list its capabilities regarding radio access technologies (RATs) (e.g., E-UTRA, UTRA, CDMA 2000, GERAN, etc.). In implementations described herein, UE capability enquiry message 410 may be configured to request a list of PLMNs (e.g., private and public network IDs) supported by a UE device. For example, a standard format of UE capability enquiry message 410 may be modified to include an additional field to request a supported PLMN list (e.g., requestSupportedPLMNlist).

In response to receiving UE capability enquiry message 410, UE device 105 may generate and transmit a UE capability information message 420 including UE-Network-Capability, to access station 215. The UE-Network-Capability information may be formatted to respond to the requestSupportedPLMNlist of UE capability enquiry message 410. The UE-Network-Capability information may include a list of PLMN IDs to which UE device 105 is subscribed. In the example of UE device 105 of FIG. 2, the UE-Network-Capability information may include a PLMN ID for private network 110.

Figure 5:
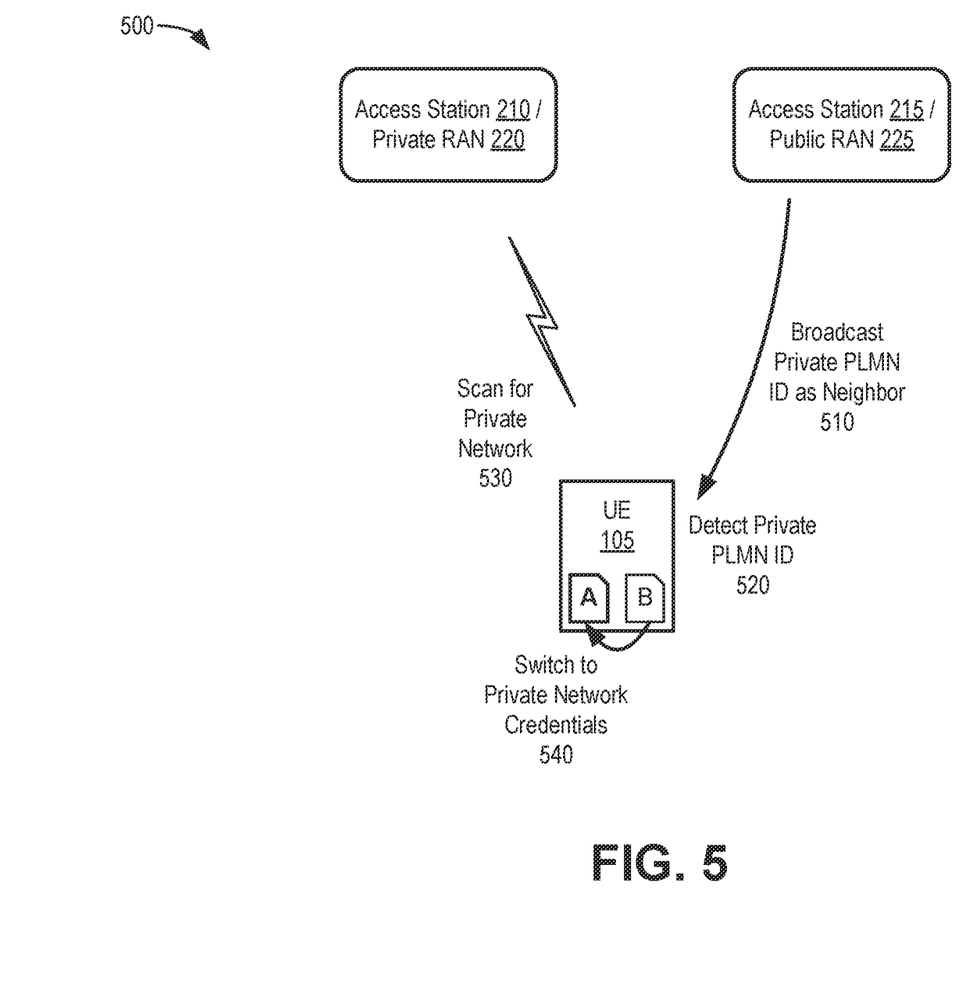
FIG. 5 is a diagram illustrating communications to direct a User Equipment (UE) device from a macro network to a private network when the UE device is in an idle mode, according to an implementation.

FIG. 5 is a diagram illustrating communications to direct a UE device from a macro network to a private network when the UE device is in an idle mode. More particularly, FIG. 5 illustrates communications in a portion 500 of network environment 200 that includes access station 215 of public RAN 225, access station 210 of private RAN 220, and UE device 105.

For UE devices capable of operating with both macro network 115 and private network 110, scanning for a private RAN by the UE device 105 located in a limited private network deployment environment may be inefficient. However, without sufficient information to identify available neighboring private RAN 220 cells and/or reselection priorities that are based on network design and loading, UE device 105 may encounter protracted mode transition (e.g., idle mode to connected mode) and/or system acquisition times, potentially negatively impacting the user experience. Accordingly, in areas having neighboring and/or overlapping private RAN and public RAN cells, access station 215 may transmit information to expedite UE device 105 establishing wireless connections with a neighboring private RAN 220 for private network 110.

As shown in FIG. 5, access station 215 may broadcast 510 a private PLMN ID as a neighbor of access station 215. The private PLMN ID may be obtained, for example, from the stored neighbor list 405 described above in connection with FIG. 4. For example, access station 215 may broadcast over a system information block (SIB) information regarding one or more private network access stations. In one implementation, access station 215 may broadcast a PLMN ID for neighboring access station 210 (e.g., PLMN ID of the private network to which the neighboring access station 210 belongs). The broadcast information may be provided over a modified Information Element (IE) SIB Type 24 (hereinafter "SIB 24"). In another implementation, access station 215 may broadcast a PLMN ID for a neighboring private access station 210 over a new or different SIB (e.g., a "SIB 25").

Figure 7A:
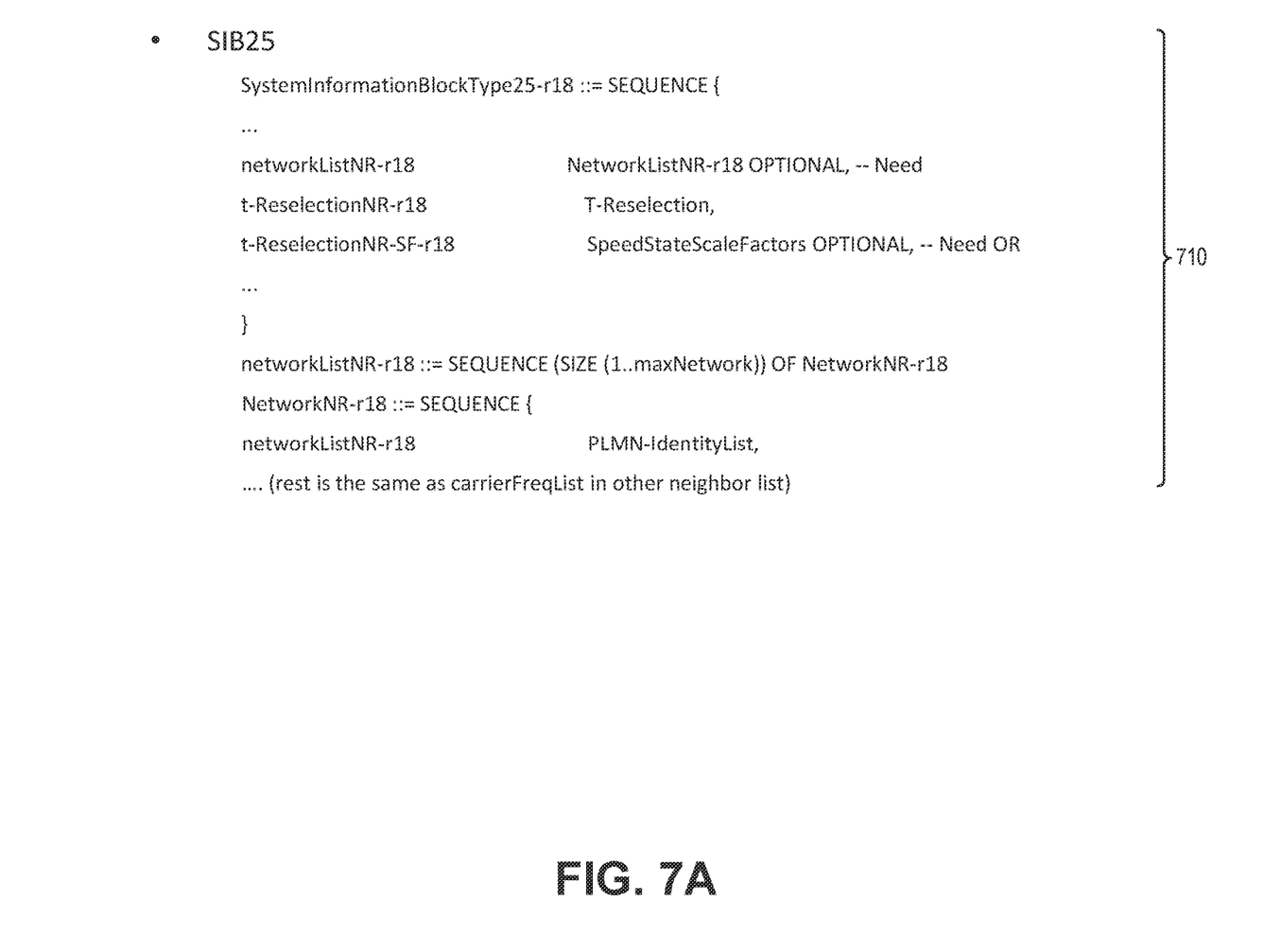
FIG. 7A is an example of neighboring private access station information that may be included in a System Information Block, according to an implementation.

The SIB 25 or modified SIB 24 (or another SIB) may contain information relevant for private network cell selection/reselection. SIB 24 may indicate "network neighbors" using the respective private network PLMN IDs as the network indicator. FIG. 7A provides an illustration of example information 710 that may be included for a new SIB 25. Similar information may be included in a modified SIB 24 or another SIB.

In the example, of FIG. 5, broadcast 510 from access station 215 may include the PLMN ID of private network 110 as a network neighbor. The private PLMN-ID in the SIB of broadcast 510 may be used by the UE device 105 receiving the broadcast information to expedite idle mode transitions from macro network 115 to private network 110 and ensure that UE device 105 selects/reselects to the higher priority private network based on subscriber priorities, for example.

Thus, as indicated at referenced 520, UE device 105 may detect that private PLMN ID is broadcasted (e.g., in a SIB) as a neighbor. UE device 105 may provide the received neighbor list to its UICC and/or local profile agent (LPA) to scan 530 for private network coverage from access station 210, since access station 215 and access station 210 may not have the same coverage. Assuming UE device 105 scans and finds private RAN 220, the UICC/LPA of UE device 105 may switch 540 to using private network credentials (e.g., SIM "A") for exiting RRC idle mode.

Figure 6:
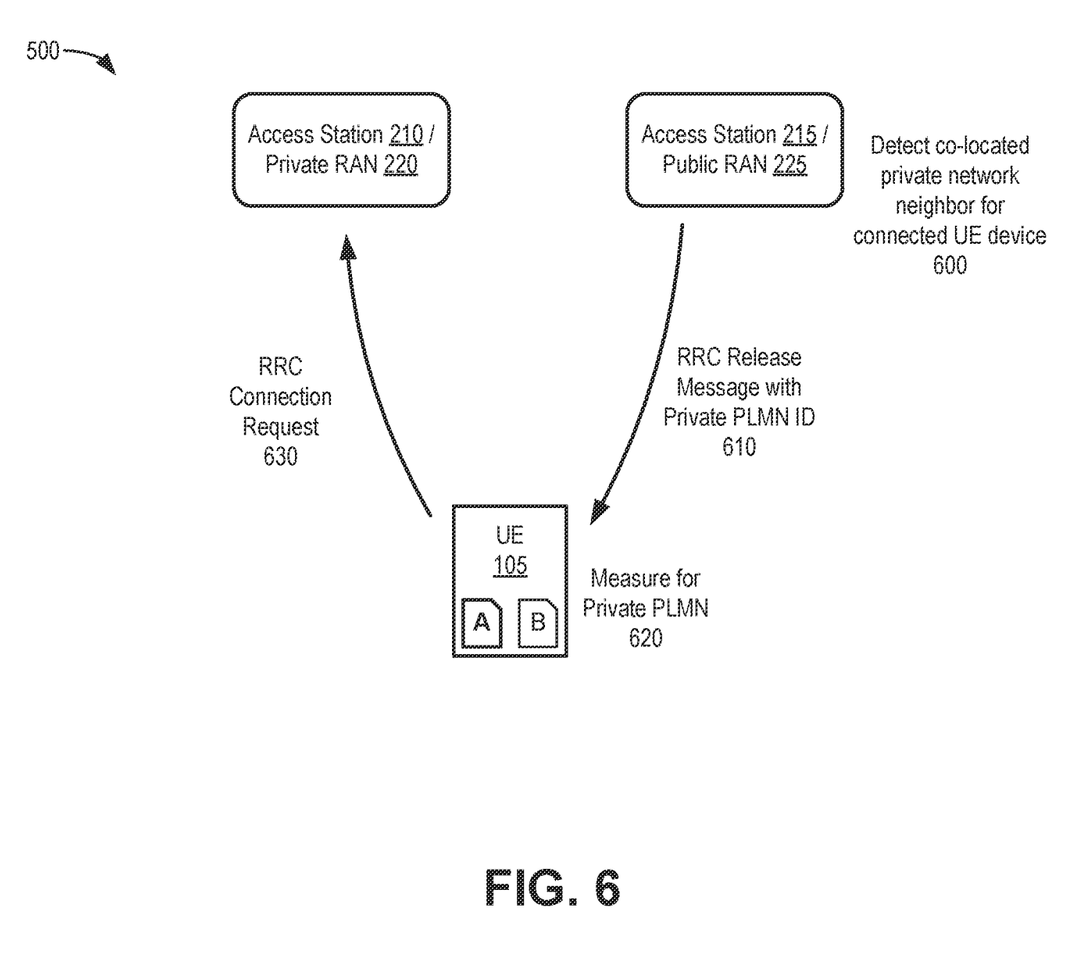
FIG. 6 is a diagram illustrating communications to redirect a UE device from a macro network to a private network when the UE device is in a connected mode, according to an implementation.

FIG. 6 is a diagram illustrating communications to redirect a UE device from a macro network to a private network when the UE device is in a connected mode. FIG. 6 illustrates communications in portion 500 of network environment 200.

In FIG. 6, assume that UE device 105 is already in RRC connected mode with access station 215 and that UE device 150 is a private-network-capable device (e.g., as determined through separate provisioning or the UE capability identification process of FIG. 4). Through the provisioning and setup of the private PLMN 110, private RAN 220 would be included in a neighboring PLMN list (e.g., neighbor list 405) for public RAN 225. Public RAN 225 would be aware there is a co-located private network neighbor (e.g., private RAN 220) for UE device 105. For example, access station 215 may compare UE capability information message 420 (FIG. 4) with stored PLMN neighbor list 405 for access station 215 and detect 600 a co-located private network neighbor for UE device 105.

Figure 7B:
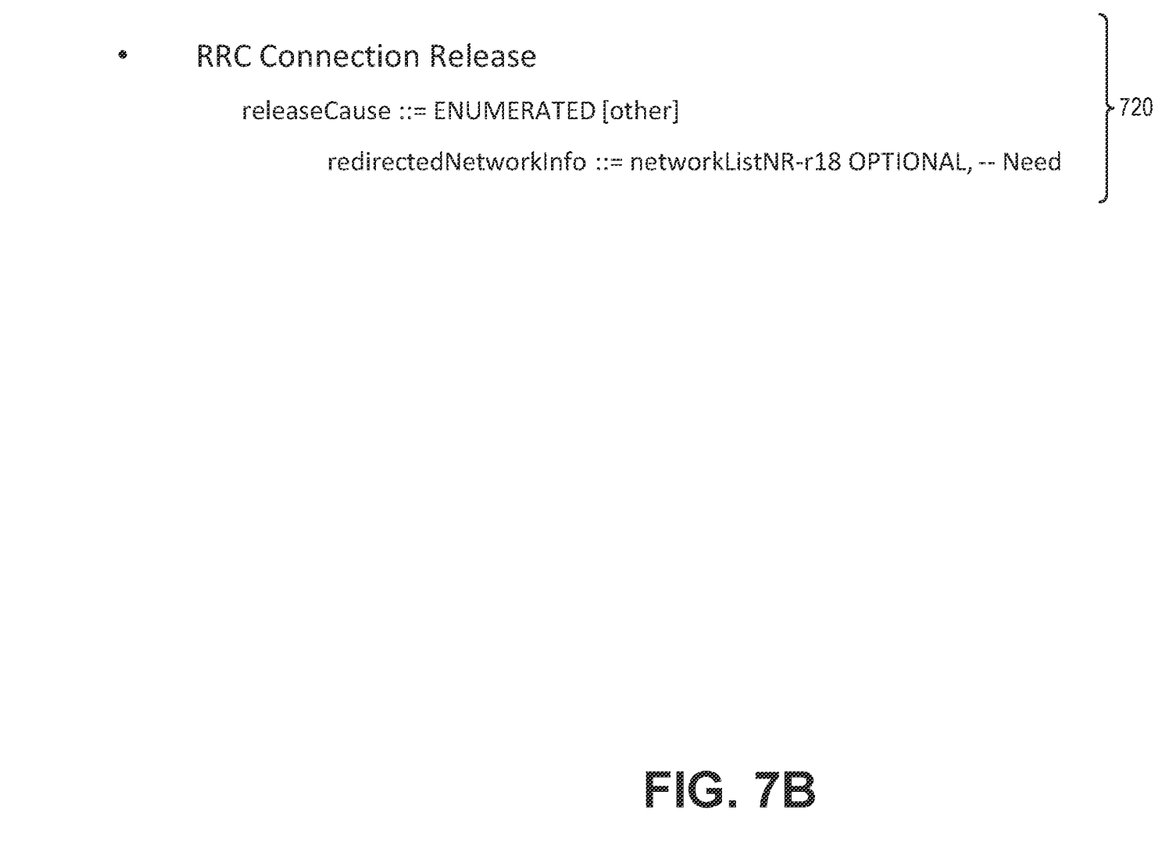
FIG. 7B is an example of neighboring private access station information that may be included in a Radio Resource Control (RRC) release message, according to an implementation.

Access station 215 may send a RRC release message 610 to UE device 105, to redirect UE device 105 to the private network. According to an implementation, a RRC release message 610 may include an additional field added to a conventional RRC release message to identify another PLMN as a redirection target if the UE device supports the high priority PLMN neighbor. Thus, an RRCRelease message may include redirectedNetworkInfo indicating redirection to a private PLMN (with the same or different radio access technology using existing redirectionCarrierInfo). The release message may include a PLMN-ID or another type of identifier for the private network. FIG. 7B provides an illustration of example information 720 that may be included in a modified RRCRelease message.

The RRC release procedure can be measurement based or non-measurement based (herein referred to as blind procedure). For a measurement based release procedure, access station 215 may send RRC release message 610 with a measurement trigger to ask UE device 105 to measure signal strength from private RAN 220 before conducting redirection. In response, UE device 105 may measure 620 signal strength for the private PLMN. For blind redirection (e.g., in confirmed co-located cases), RAN 225 may instruct a blind redirection (e.g., that doesn't require UE device 105 to first measure signal strength of private RAN 220).

When UE device 105 receives the RRC release message 610 with redirection target of the private PLMN and UE device 105 has credentials (e.g., SIM "A") to access the private PLMN, UE device 105 will attempt to access private RAN 220 (e.g., via providing an RRC connection request 630).

Figure 8:
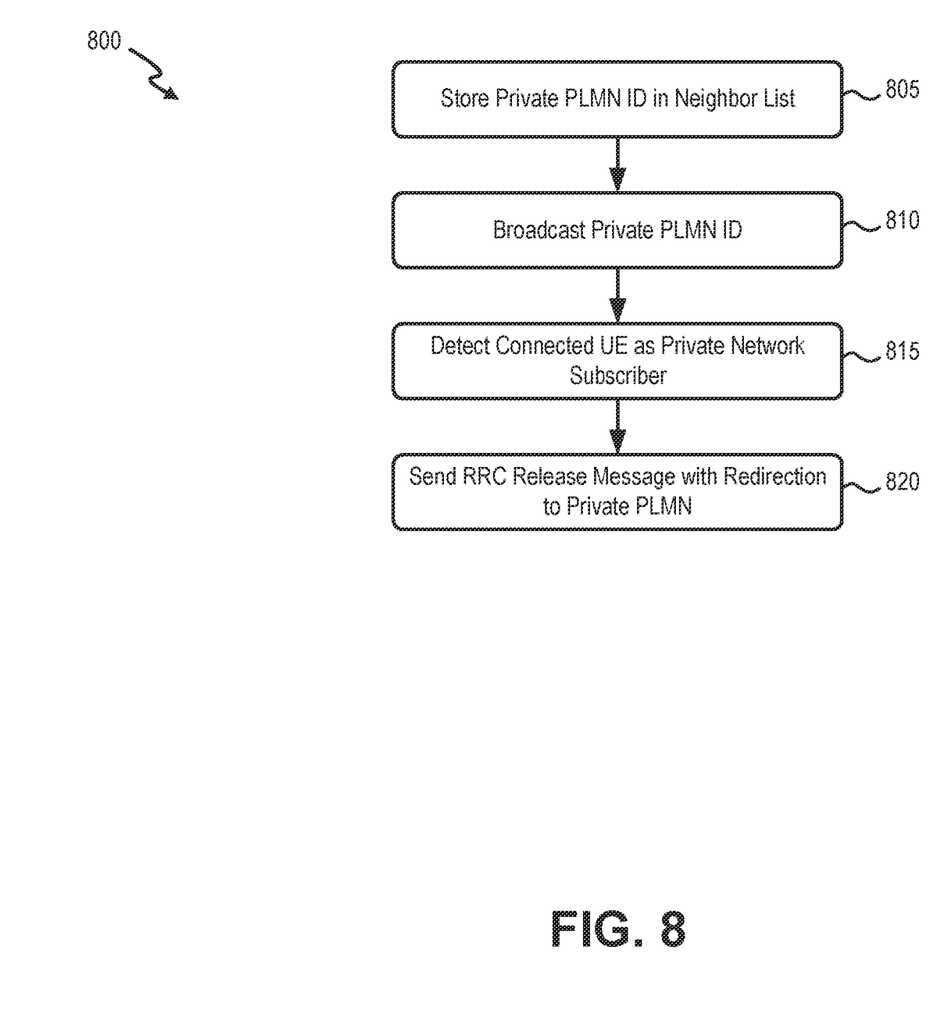
FIGS. 8 and 9 are flow diagrams illustrating processes for providing network driven private and macro network interworking, according to implementations described herein.

FIG. 8 is a flow diagram illustrating a process 800 for providing network driven private and macro network interworking. In one implementation, process 800 may be implemented by devices in a macro PLMN, such as macro network 115. In another implementation, process 800 may be implemented by devices in macro network 115 in conjunction with one or more other devices in network environment 100, such as UE device 110. Process 800 may address network-driven private and macro network interworking for UE devices in an idle mode or connected mode.

Process 800 may include storing a private PLMN ID in a neighbor list (block 805) and broadcasting the private PLMN ID (block 810). For example, access station 215 of public RAN 225 may store a "knowledge/neighbor" list of private PLMNs that are co-located in the coverage area (or cell) of access station 215. Additionally, access station 215 may broadcast 510 a private PLMN ID for a neighbor of access station 215. The private PLMN ID may be obtained, for example, from the stored neighbor list and broadcast over a new or modified system information block (SIB). The private PLMN ID may be used by a UD device 105 in idle mode to initiate a switch to credentials for the private PLMN.

Process 800 may further include detecting a connected UE as a private network subscriber of a neighboring private PLMN (block 815) and sending an RRC release message with redirection to the private PLMN (block 820). For example, access station 215 may provide a UE capability enquiry message 410 that includes a request for a supported PLMN list. In response to the UE capability enquiry message 410, a UE device 105 may generate and transmit to access station 215 a UE capability information message 420 including a list of PLMN IDs to which UE device 105 is subscribed. Based on stored neighbor list 405 and UE capability information message 420, access station 215 may compare UE capability information with neighbor PLMN-IDs and detect a co-located private network neighbor for UE device 105. Assuming access station 215 identifies a private PLMN with the matching PLMN ID, access station 215 may send a modified RRC release message 610 with the PLMN ID for the private network as redirection target for UE device 105.

Figure 9:
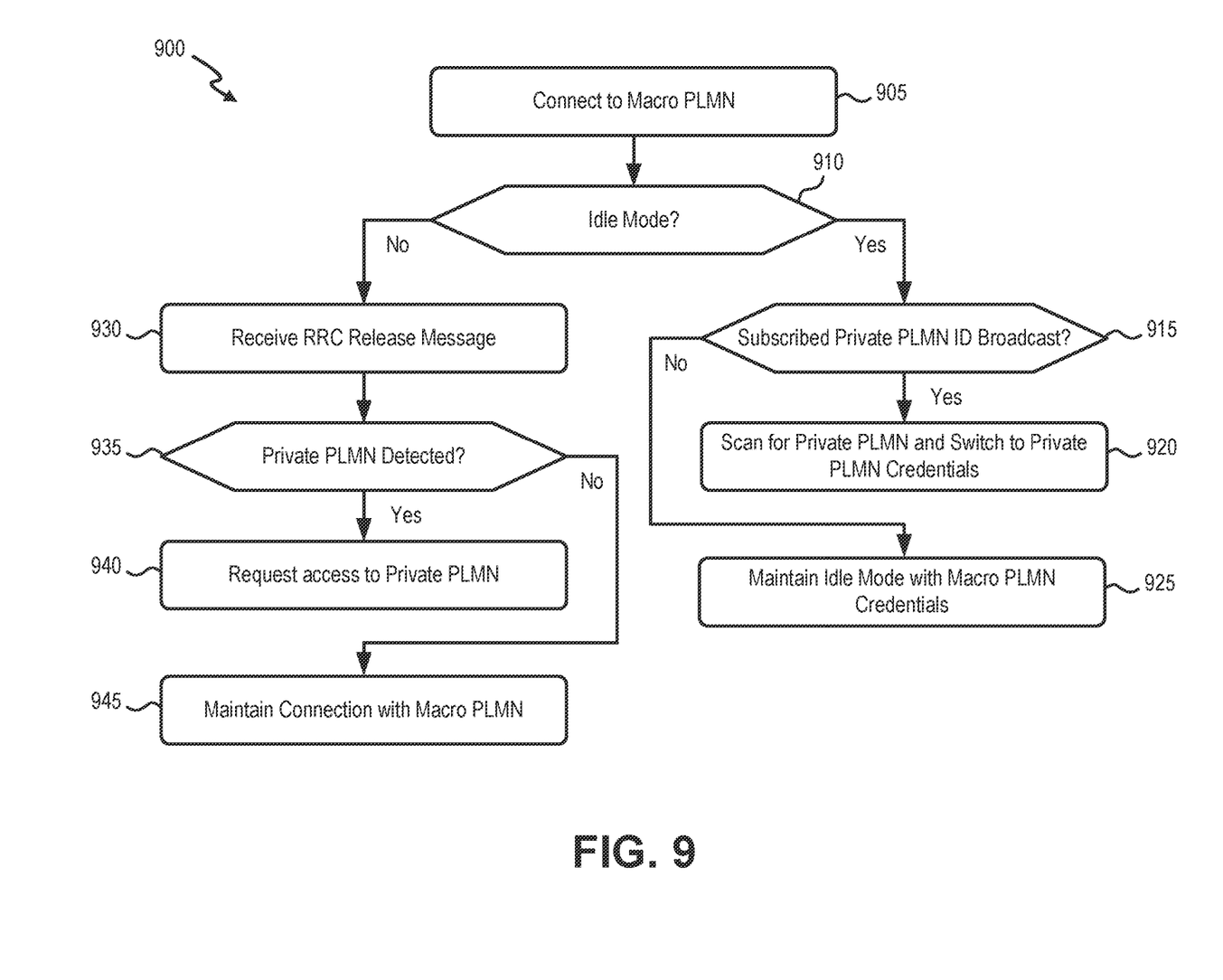

FIG. 9 is a flow diagram illustrating a process 900 for providing network driven private and macro network interworking. In one implementation, process 900 may be implemented by UE devices (e.g., UE device 105) that are configured with subscriptions for both private networks and public networks. In another implementation, process 900 may be implemented by UE device 105 in conjunction with one or more other devices in network environment 100, such as devices in macro network 115. Process 900 may address UE actions to support network-driven private and macro network interworking.

Process 900 may include connecting to a macro PLMN (block 905) and identifying if the UE device enters an idle mode (block 910). For example, UE device 105 may attach to public RAN 225 and connect to macro network 115. Depending on an activity level, UE device 105 may enter an idle mode.

If the UE device enters an idle mode (block 910—Yes), it may be determined if a subscribed private PLMN ID is being broadcast as an ID of a neighbor PLMN (block 915). For example, access station 215 may broadcast 510 (e.g., in a new or modified SIB) a private PLMN ID for a neighbor of access station 215.

If a subscribed private PLMN ID is being broadcast as the ID of a neighbor PLMN (block 915—Yes), the UE device may scan for the private PLMN and switch to private PLMN credentials (block 920). For example, UE device 105 may recognize the private PLMN ID broadcast by access station 215. A UICC/LPA of UE device 105 scan for private PLMN coverage. Assuming UE device 105 scans and finds private RAN 220, the UICC/LPA of UE device 105 may switch to using its private PLMN credentials.

If a subscribed private PLMN ID is not being broadcast as a neighbor PLMN (block 915—No), the UE device may maintain the idle mode with the macro PLMN credentials (block 925). For example, UE device 105 would not switch credentials from the public RAN 225 if UE device did not recognize a private PLMN ID (e.g., as a subscriber) or does not detect sufficient signal strength from private RAN 220.

If the UE device does not enter an idle mode (block 910—No), UE device may receive a RRC release message (block 930) and determine if the private PLMN can be detected (block 935). For example, access station 215 may compare UE capability information message 420 with a stored PLMN neighbor list 405 for access station 215 and detect a co-located private network neighbor for UE device 105. Based on this detection, access station 215 may send a RRC release message that identifies the private PLMN as a redirection target. UE device 105 may receive the RRC release message and may measure a signal strength for the private PLMN.

If the private PLMN can be detected (block 935—Yes), the UE device may request access to the private PLMN (block 940). For example, when UE device 105 receives the RRC release message with a redirection target of the private PLMN and UE device 105 has credentials to access the private PLMN, UE device 105 will attempt to access private RAN 220.

If the private PLMN cannot be detected (block 935—No), the UE device may maintain a connection with the macro PLMN (block 945). For example, UE device 105 would not switch from the public RAN 225 if UE device did not detect sufficient signal strength from private RAN 220 (or if an attempted connection to the private PLMN fails).

Systems and methods described herein provide a network-based solution to efficiently transition private network subscribers from a macro network to a private network. In contrast with a device-based approach, this network-based approach provides fast transitions to private networks and is more battery friendly for the UE device.

The foregoing description of embodiments provides illustrations but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive.

In addition, while series of blocks and signals have been described with regard to the processes illustrated in FIGS. 4-6, 8 and 9, the order of the blocks and/or signals may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 320, etc.), or a combination of hardware and software. The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 320) of a computational device. A non-transitory storage medium includes one or more of the storage mediums described in relation to memory 330.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method, comprising:
   storing, at an access station for a macro Public Land Mobile Network (PLMN), a neighbor list identifying a private network that has overlapping coverage with a cell for the access station;
   detecting, by the access station, that a user equipment (UE) device connected to the access station has a subscription to the private network, wherein the detecting includes:
      sending, during an attachment procedure, a UE capability inquiry to the UE device,
      receiving a UE network capability response from the UE device, and
      comparing the UE network capability response with the neighbor list; and
   sending, by the access station and in response to the detecting, a release message to the UE device, wherein the release message includes a PLMN identifier (ID) as a redirection target to the private network.

2. The method of claim 1, further comprising:
   broadcasting, by the access station, an identifier for the private network.

3. The method of claim 2, wherein broadcasting the identifier includes:
   broadcasting a system information block that includes a PLMN-ID for the private network.

4. The method of claim 2, wherein broadcasting the identifier for the private network triggers the UE device in an idle mode to:
   scan for signals from the private network, or
   switch to using credentials for the private network.

5. The method of claim 1, wherein sending the release message further comprises:
   sending, to the UE device, a measurement trigger requesting the UE device to measure signal strength from the private network before conducting a redirection.

6. The method of claim 1, wherein the UE capability inquiry is configured to request a list of PLMNs supported by the UE device.

7. The method of claim 1, wherein the UE network capability response includes a list of PLMN IDs that identify PLMNs to which the UE device is subscribed.

8. The method of claim 1, wherein the subscription establishes a priority associated with the private network to be higher than a priority associated with the macro PLMN.

9. The method of claim 1, wherein the macro PLMN and the private network require different credentials from the UE device.

10. A network device comprising:
    a processor configured to:
       store, in a macro Public Land Mobile Network (PLMN), a neighbor list identifying a private network that has overlapping coverage with a cell for the macro PLMN;
       detect that a user equipment (UE) device connected to the network device has a subscription to the private network, wherein the detecting further includes the processor configured to:

send, during an attachment procedure, a UE capability inquiry to the UE device, receive a UE network capability response from the UE device, and compare the UE network capability response with the neighbor list; and send, in response to the detecting, a release message to the UE device, wherein the release message includes a PLMN identifier (ID) as a redirection target to the private network.

11. The device of claim 10, wherein the processor is further configured to:

broadcast an identifier for the private network.

12. The device of claim 10, wherein the network device includes an access station for a radio access network (RAN).

13. The device of claim 10, wherein when sending the release message, the processor is further configured to:

send, to the UE device, a measurement trigger requesting the UE device to measure signal strength from the private network before conducting a redirection.

14. The device of claim 10, wherein the UE network capability response includes a list of PLMN IDs that identify PLMNs to which the UE device is subscribed.

15. The device of claim 10, wherein the macro PLMN uses different credentials from the UE device than the private network.

16. The device of claim 10, wherein the release message includes a Radio Resource Control (RRC) release message.

17. A non-transitory computer-readable medium comprising processor-executable instructions that, wherein when executed by a processor, cause the processor to:

store, at an access station for a macro Public Land Mobile Network (PLMN), a neighbor list identifying a private network that has overlapping coverage with a cell for the access station;

detect that a user equipment (UE) device connected to the access station has a subscription to the private network, wherein the detecting further causes the processor to:

send, during an attachment procedure, a UE capability inquiry to the UE device, receive a UE network capability response from the UE device, and compare the UE network capability response with the neighbor list; and send, in response to the detecting, a release message to the UE device, wherein the release message includes a PLMN identifier (ID) as a redirection target to the private network.

18. The non-transitory computer-readable medium of claim 17, further comprising instruction that cause the processor to:

broadcast an identifier for the private network in a system information block (SIB).

19. The non-transitory computer-readable medium of claim 17, wherein the instructions to detect that the UE device has the subscription to the private network further comprise instruction that cause the processor to:

receive, from the UE device, a list of PLMNs to which the UE device is subscribed.

20. The non-transitory computer-readable medium of claim 17, wherein the release message includes a Radio Resource Control (RRC) release message.

* * * * *